Nov. 29, 1966  E. BADE  3,288,450
METHOD OF AND APPARATUS FOR RECOVERING SUBSTANCES
WITH A HIGH ALKALI PERCENTAGE FROM THE
FLUE GASES OF CEMENT KILNS
Filed Nov. 19, 1963
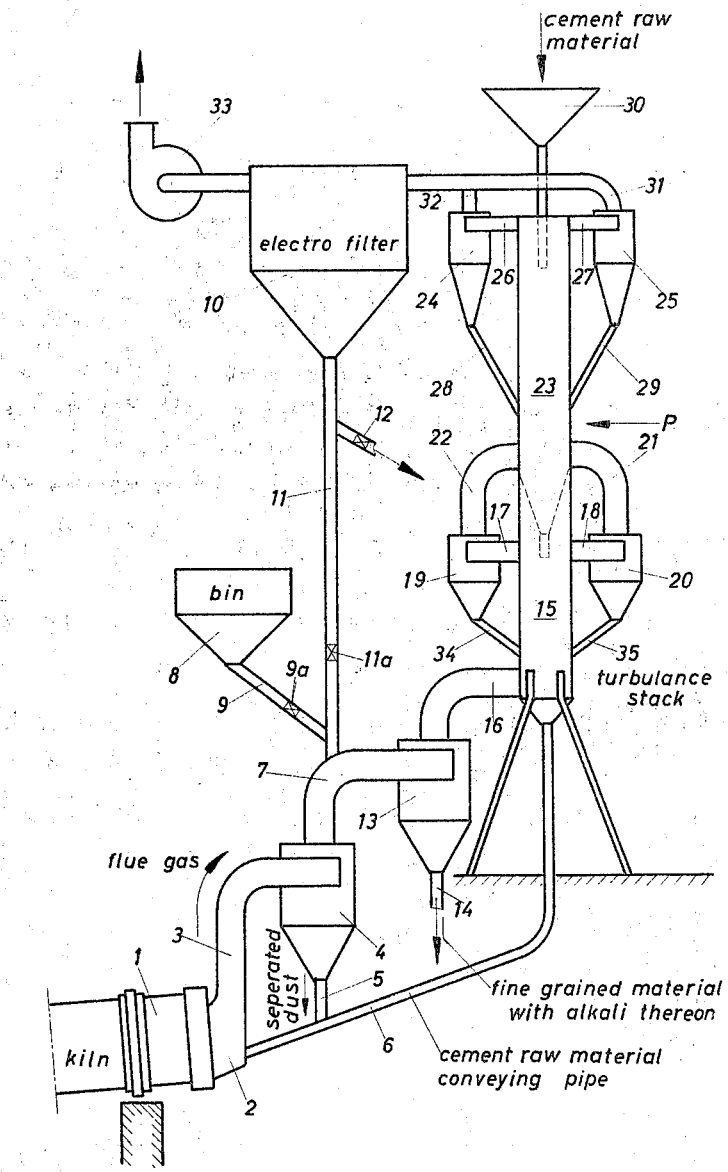
INVENTOR
Erich Bade
BY
Walter Becker
Patent Agent

United States Patent Office 3,288,450
Patented Nov. 29, 1966

3,288,450
METHOD OF AND APPARATUS FOR RECOVERING SUBSTANCES WITH A HIGH ALKALI PERCENTAGE FROM THE FLUE GASES OF CEMENT KILNS
Erich Bade, Beckum, Westphalia, Germany, assignor to Polysius G.m.b.H., Neubeckum, Westphalia, Germany
Filed Nov. 19, 1963, Ser. No. 335,451
5 Claims. (Cl. 263—32)

The present invention relates to a method of and device for increasing the percentage of alkali in substances removed from the flue gases of cement kilns.

With modern cement kilns in which the flue gases of the kilns are made use of for preheating the cement raw material, the alkali circulation causes particular difficulties in view of the alkali deposits forming in the preheater.

According to a heretofore known method for removing the alkalis from the flue gases, the flue gases, prior to entering the preheater, are passed through a vessel into which a cold fine-grained solid substance is introduced for causing a deposit of the alkalis carried by the flue gases, said substance being brought into contact with the flue gases. The fine-grained substance or material is then, together with the deposited alkalis, removed from the apparatus.

The above-mentioned method has the drawback that the dust carried away by the flue gases from the kiln is likewise withdrawn. The dust load of the flue gases is, however, particularly high at the kiln entrance so that economically intolerably large quantities of cement material to be burned are eliminated from the burning process. In view of this high percentage of kiln dust, the alkali concentration of the separated material is rather low. For this reason, a refining and further processing of the separated material has been uneconomical.

It is, therefore, an object of the present invention to provide a method of and apparatus for recovering alkali from substances contained in the flue gases of cement kilns, which will overcome the above-mentioned drawbacks.

It is another object of this invention to provide a method of and apparatus for increasing the concentration of alkali in the substances removed from the flue gases of cement kilns.

These and other objects and advantages of the invention will appear more clearly from the following specification in connection with the accompanying drawing showing an apparatus according to the invention for carrying out the method according to the present invention.

The present invention is characterized primarily in that, prior to contacting the flue gases with a cold fine-grained solid material, the dusts carried away from the kiln by the flue gases are removed from the flue gases while the alkalis in the flue gases are still in a gaseous condition.

The thus separated dusts are directly returned to the kilns. The cold fine-grained solid material then introduced into the flue gas flow is, together with the alkalis deposited thereon withdrawn, and experience has shown that this withdrawn material has such a high alkali concentration that an employment thereof as fertilizer or a further processing thereof, for instance, by leeching, has proved worthwhile from an economical standjoint.

As cold fine-grained solid material, preferably the fine dust separated in an electrofilter is employed inasmuch as such fine dust, in view of its relatively large surface with regard to its specific weight, has proved particularly suitable for the deposit of alkalis.

However, if desired, also other materials such as cement raw meal may be introduced into the flue gas flow provided that such materials with alkalis deposited thereon permit a favorable further processing thereof.

Referring now to the drawing in detail, the reference numeral 1 designates a rotary kiln the inlet end of which has connected thereto a gas conduit 3 through the intervention of the kiln head 2. Conduit 3 leads into a cyclone 4 the discharge pipe 5 of which leads into a feeding conduit 6 which leads from a preheater, generally designated P, to the rotary kiln 1. Connected to the cyclone 4 is a gas conduit 7 into which may be introduced fine-grained material from a bin 8 through a conduit 9 or from an electrofilter 10 through conduit 11. The conduits or pipes 9 and 11 are provided with shut-off valves 9a, 11a or metering devices. Pipe 11 is provided with a branch-off pipe 12 for discharging a portion of or the total electrofilter dust. The gas conduit 7 leads into the cyclone 13 having a discharge pipe 14. Also connected to the cyclone 13 is a gas conduit 16 leading into the turbulence stack 15. Branching off from the tubulence stack 15 are gas conduits 17 and 18 respectively leading into the cyclones 19 and 20, which latter are provided with discharge pipes 34 and 35 leading back into the turbulence stack 15. Also connected to the cyclones 19 and 20 are gas conduits 21 and 22 leading into the turbulence stack 23.

The cyclones 24 and 25 provided with gas inlet conduits 26 and 27 and material discharging conduits 28 and 29 communicate with the turbulence stack 23 in a manner corresponding to that described in connection with the cyclones 19 and 20 and the conduits 17, 18, 21, 22, 34 and 35. The raw material is charged through funnel 30 into the turbulence stack 23. The flue gas conduits 31 and 32 lead from the cyclones 25 and 24 respectively to the electrofilter 10 behind which there is arranged a blower 33.

*Operation*

The flue gases leaving the cement kiln 1 pass through gas conduit 3 into cyclone 4 where they are freed from the dust carried away by said flue gases from the kiln. The separated dust passes through discharge pipe 5 into the raw material feeding conduit 6 and together with the raw material passes directly back into the kiln.

The alkalis carried away by the flue gases pass together with the flue gases through the cyclone. Inasmuch as at this stage, the alkalis are still gaseous, no sticking of the alkalis to walls of the conduits or cyclone passed through so far, is to be feared. The cold fine-grained material passed from bin 8 and from electrofilter 10 into the gas conduit 7 now induces the alkalis to sublimate and to be deposited on said solid fine-grained material. This solid material with the alkali deposit thereon is separated in cyclone 13 from the flue gases and is discharged through conduit 14 whereupon it may be processed further.

It will thus be appreciated that by previously separating the dust from the flue gases which carried the same away from the furnace, the said dust is recovered for the burning process, while on the other hand, the alkali concentration of the material separated in cyclone 13 has been considerably increased.

It is, of course, to be understood that the present invention is by no means limited to the particular example and apparatus described above, but also comprises any modifications within the scope of the appended claims. Thus, the invention may also be used in a corresponding manner with cement burning plants equipped with cyclone preheaters or grate preheaters and may also be employed in connection with blast installations. Also, other chemical substances which, during a burning or sintering process behave similarly to alkalis, may be obtained in a concentrated form, in conformity with the method according to the present invention.

Such chemical substances are, for instance, lead sulphide, sulfides of other metals or carbonates respectively.

As cold fine-grained solid material may, in addition to cement fine dust separated by the electrofilter 10 or in addition to cement raw material, also be employed substances such as finely-ground sand and limestone.

What I claim is:

1. In a method of recovering alkali from alkali containing flue gases of a cement kiln, preheating the cement raw material to be burned by direct contact with the flue gases from the cement kiln, contacting the flue gas prior to preheating the cement raw material with a cold fine-grained material to cause the alkali to settle on said fine-grained material, and effecting separation of the said fine-grained material and the alkali settled thereon from the flue gases and, prior to said flue gases being contacted with said cold fine-grained material, and while the alkali in said flue gases is still in a gaseous condition, removing from said flue gases cement dust carried by said flue gases.

2. A method according to claim 1, which includes the step of: returning the cement dust removed from said flue gases to the cement kiln.

3. An arrangement for recovering alkali from the flue gas of a cement kiln, which comprises: a cement kiln, preheating means adapted to receive cement raw material to be burned, cement raw material conveying conduit means leading from said preheating means to said kiln for conveying preheated raw material to said kiln, flue gas conveying conduit means leading from said kiln to said preheating means, serially arranged first and second separator means interposed between said cement kiln and said preheating means in said conduit means, said first separator means being operable for separating cement dust carried by said flue gas from the latter, and additional conduit means leading into said flue gas conveying conduit means between said first and second separator means for conveying thereinto a cold fine-grained material on which gaseous alkali in the flue gas will settle, said second separator means being operable for separating from said flue gas said fine-grained material together with alkali settled thereon.

4. An arrangement according to claim 3, which includes return conduit means communicating with said kiln and said first separator means for conveying cement dust separated from said flue gas by said first separator means to said kiln.

5. An arrangement according to claim 3, which includes return conduit means communicating with said kiln and said first separator means for conveying cement dust separated from said flue gas by said first separator means to said kiln, a discharge line for cooled flue gases leading from said preheating means, an additional separator in said discharge line for separating particles of material from said cooled flue gases, further additional conduit means leading from said additional separator into said flue gas conveying conduit means between said first and second separator means for conveying said particles of material thereinto, and means for controlling said additional and further additional conduit means.

References Cited by the Examiner

UNITED STATES PATENTS 3,110,483 11/1963 Baxa _____ 263—53

FOREIGN PATENTS 626,639 8/1961 Canada.
789,962 1/1958 Great Britain.

FREDERICK L. MATTESON, JR., *Primary Examiner.*

JOHN J. CAMBY, *Examiner.*